United States Statutory Invention Registration [19]

[11] Reg. Number: H157

Smith [43] Published: Nov. 4, 1986

[54] WORK REST SUPPORT ASSEMBLY

[75] Inventor: Thomas V. Smith, Troy, N.Y.

[73] Assignee: The United States of America as represented by the Secretary of the Army, Washington, D.C.

[21] Appl. No.: 791,265

[22] Filed: Oct. 25, 1985

[51] Int. Cl.[4] ..... B23B 25/00

[52] U.S. Cl. ..... 82/39

*Primary Examiner*—Harold J. Tudor

*Attorney, Agent, or Firm*—Anthony T. Lane; Harold H. Card, Jr.; Michael C. Sachs

[57] ABSTRACT

A stand-alone support assembly for supporting at least one pass-through work rest in independent relation to a machine tool includes a base member, a slide base, a horizontal slide block and a vertical slide block which are mutually cooperable to facilitate positioning of a pass-through work rest in three mutually perpendicular planes so as to enable exact positioning of the work rest relative to a workpiece supported by the machine tool.

11 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WORK REST SUPPORT ASSEMBLY

The invention described herein may be manufactured, used and licensed by or for the Government for Governmental purposes without the payment to me of any royalties thereon.

BACKGROUND OF THE INVENTION

The present invention relates generally to work rest supports, and more particularly to a novel work rest support assembly which finds particular application in supporting a pass-through work rest relative to a machine tool or the like in independent stand-alone relation so as to facilitate selective positioning of the pass-through work rest in three mutually perpendicular planes.

It is a common practice in the manufacture of long heavy cylindrical workpieces, such as large caliber gun barrels or tubes, to support the elongated workpieces proximate their longitudinal centers during machining, in addition to supporting their opposite ends by means of chucks or headstocks and tailstocks of the associated machine tools. For example, in lathe turning and machining of long heavy gun barrels or tubes, the advantage of supporting the barrel or tube generally centrally of its longitudinal length so as to reduce sagging is readily apparent. One technique for supporting the longitudinal center of a long heavy workpiece such as a gun tube is to employ a pass-through work rest which is positioned to provide the desired mid-length support and which allows continuous cutting or machining of the outer periphery of the workpiece by permitting a cutting tool to pass through the area supported by the work rest without interrupting the turning cycle of the associated machine tool.

Pass-through work rests of the aforementioned type are commercially available. In general, however, the known pass-through work rests are attached to associated machine tools so as to become a permanent part of the machine tool. When fixedly secured to or formed integral with a machine tool, the pass-through work rest, while generally having components adjustable to accommodate different diameter workpieces, is fixed in predetermined relation to the centerline between the headstock and tailstock of the particular machine tool and has no need for portability to accommodate different size machine tools having different floor-to-workpiece centerline dimensions.

While pass-through work rests of the aforementioned type which are attached to and form a permanent part of a specific machine tool have been found satisfactory for their intended purposes, their inability to be transferred for use with different size machine tools limits their use to the specific machine tool to which they are attached and, accordingly, adds to the cost of the associated machine tool. A need thus exists for an outboard or off machine pass-through work rest support arrangement which, while not integral with or otherwise a permanent part of an associated machine tool, enables exact positioning of an associated pass-through work rest relative to the working axis of the machine tool with which the work rest is to be employed. Such a stand-alone work rest support arrangement or assembly finds particular application with machine tools, such as lathes, of different floor to workpiece centerline heights, thus being particularly adapted for use in turning operations which require a supporting work rest intermediate the length of a heavy elongated workpiece such as a gun barrel or tube to prevent sagging.

SUMMARY OF THE INVENTION

One of the primary objects of the present invention is to provide a novel work rest support assembly which finds particular application in supporting a pass-through work rest in independent, stand-alone relation to a machine tool or the like and which facilitates selective positioning of a pass-through work rest in three mutually perpendicular planes.

A more particular object of the present invention is to provide a novel work rest support assembly as aforementioned which facilitates use with machine tools, such as lathes, having different floor-to-workpiece centerline heights or dimensions, and which is independent of the machine tool while facilitating exact positioning of a pass-through work rest in three mutually perpendicular planes relative to the workpiece centerline of the associated machine tool.

A still further object of the present invention is to provide a novel pass-through work rest support assembly having a base member adapted to rest on a support surface, such as a floor or the like, a slide base supported by the base member, a horizontal slide block supported by the slide base and a vertical slide block supported by the horizontal slide block, the base member, slide base, horizontal slide block and vertical slide block having mutually cooperable reference surfaces and associated adjustment means cooperative to facilitate positioning of a pass-through work rest mounted on the vertical slide block in three mutually perpendicular planes so as to enable exact positioning relative to a workpiece centerline axis defined by a machine tool or the like.

Further objects and advantages of the present invention, together with the organization and manner of operation thereof, will become apparent from the following description of the invention when taken in conjunction with the accompanying drawings wherein like reference numerals designate like elements throughout the several views.

DESCRIPTION OF PREFERRED EMBODIMENTS

Figures 1, 2, 3:
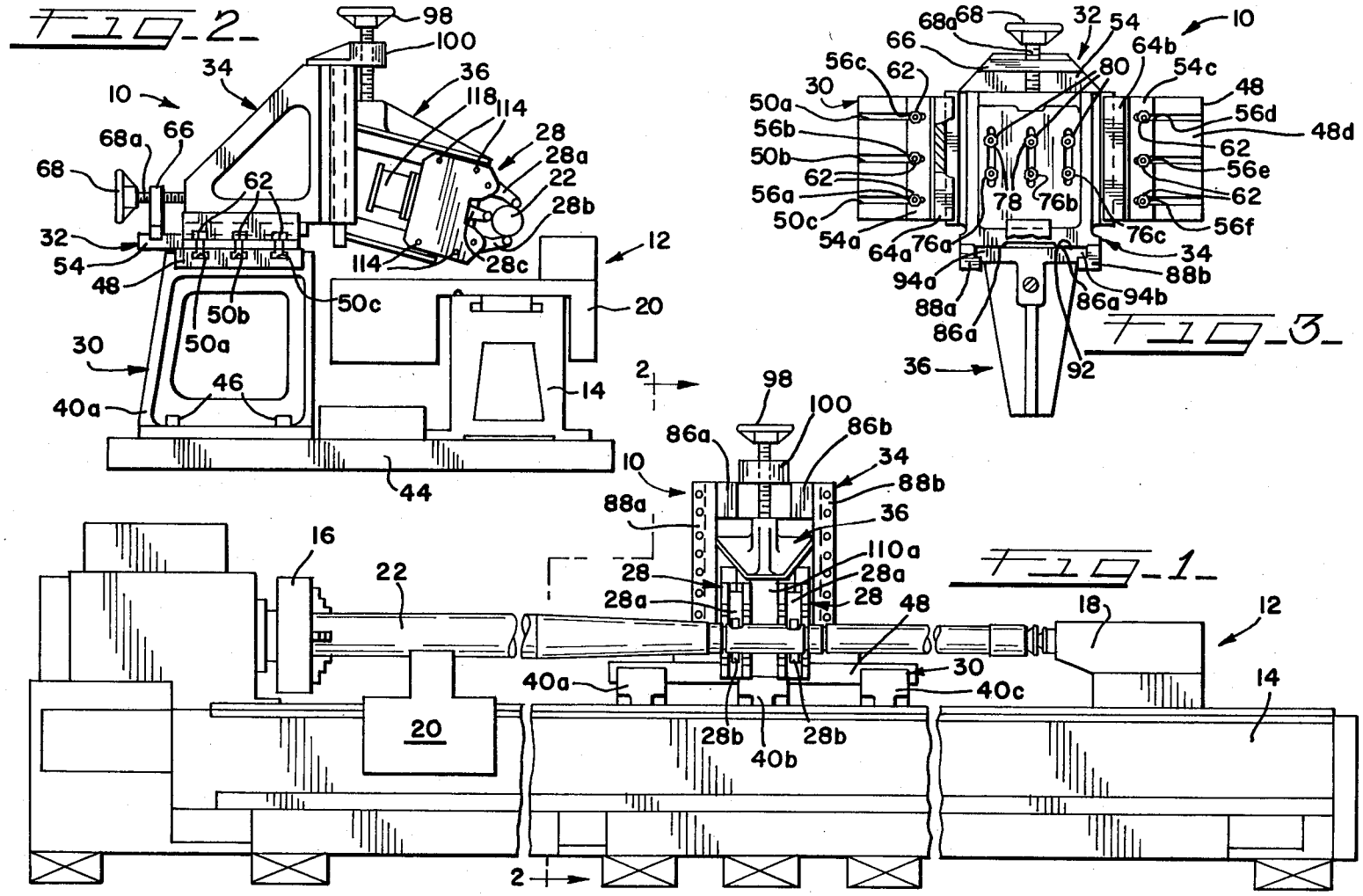
FIG. 1 is a foreshortened front elevational view of a machine tool having a workpiece supported thereby in operative association with a pass-through work rest support assembly constructed in accordance with the present invention.
FIG. 2 is a vertical sectional view, taken substantially along line 2—2 of FIG. 1, with portions of the machine tool removed for purposes of illustration.
FIG. 3 is a plan view of the work rest support assembly shown in FIGS. 1 and 2, but with the work rests removed and portions broken away for purposes of clarity.
Figure 4:
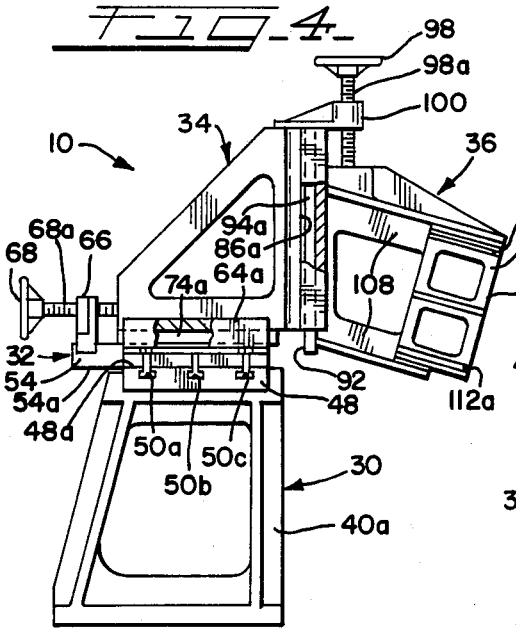
FIG. 4 is a side elevational view of the work rest support assembly shown in FIG. 2 but with the pass-through work rests removed and portions broken away for purposes of clarity.

Referring now to the drawings, a stand-alone work rest support assembly constructed in accordance with the present invention is indicated generally at 10 in the various views. The work rest support assembly 10 is shown in FIGS. 1 and 2 in operative association with a machine tool which, in the illustrated embodiment, takes the form of a lathe, indicated generally at 12. As will become apparent, the work rest support assembly 10 may be employed with various types of machine tools of different sizes where support of a heavy elongated workpiece is desirable to prevent sagging and thereby ensure close machining tolerances throughout the length of the workpiece.

The lathe 12 comprises a conventional engine lathe having substantially horizontal ways 14 which extend between a rotatable headstock or drive chuck 16 and a tailstock 18. A carriage 20 is adapted to be selectively moved along the length of the ways 14 between the headstock and tailstock and is adapted to support a tool (not shown), such as a cutting tool, in adjustable relation to an elongated workpiece 22 supported by and between the headstock or chuck 16 and the tailstock 18. The workpiece 22 may comprise an elongated heavy generally cylindrical workpiece, such as a relatively large caliber gun barrel, frequently termed a tube, which is supported by the machine tool so as to facilitate selective machining of the outer peripheral surface of the workpiece upon selective movement of the carriage 20 and associated cutting tool along the longitudinal length of the workpiece.

In accordance with the illustrated embodiment of the present invention, the stand-alone work rest support assembly 10 is adapted to support two substantially identical pass-through work rests, each of which is indicated generally at 28, so as to position the work rests in tandem relation proximate the longitudinal center of the workpiece 22 such that the work rests support the workpiece and prevent sagging thereof while facilitating continuous cutting or machining of the outer periphery of the workpiece by the cutting tool as the carriage 20 is caused to traverse the ways 14. The work rest support assembly 10 is independent of the machine tool 12 and thereby permits outboard or off-machine supporting of the pass-through work rests 28 while facilitating positioning of the work rests in three mutually perpendicular planes so as to provide exact alignment or predetermined positioning of the work rests relative to the rotational axis or centerline about which the workpiece rotates which coincides with the centerline extending between the headstock and tailstock of the machine tool.

Referring to FIGS. 3–6, taken in conjunction with FIGS. 1 and 2, the support assembly 10 includes a base member 30 on which a slide base 32 is supported for movement relative to the base member. The slide base 32 supports a horizontal slide block 34 which, in turn, supports a vertical slide block 36 on which the two pass-through work rests 28 are mounted in tandem relation. As will become more apparent hereinbelow, the base member 30, slide base 32, horizontal slide block 34 and vertical slide block 36 have mutually cooperable reference surfaces and associated adjustment means which facilitate positioning of the work rests 28 in three mutually perpendicular planes so as to enable exact positioning thereof relative to the centerline of the workpiece 22.

In the illustrated embodiment, the base member 30 includes three substantially identical pedestals **40*a*, 40*b*, and 40*c* which are interconnected in fixed upstanding relation by suitable connector channels, two of which are indicated at 42*a* and 42*b*. The upstanding pedestals 40*a–c* have coplanar bottom surfaces which collectively define a first reference surface and are adapted to rest on a support surface such as a floor or platform, illustrated at 44 in FIG. 2, such that the pedestals may be releasably affixed to the support surface as through screws, two of which are indicated at 46. An elongated generally rectangular platen 48 is fixed to and supported by the upper ends of the pedestals 40*a–c* and defines an upwardly exposed substantially horizontal reference surface 48*a*, termed a second reference surface, which is parallel to the plane of the first reference surface. Three longitudinally extending parallel spaced inverted T-shaped guide channels 50*a–c* are formed in the surface 48*a*** of the platen so as to extend the full longitudinal length of the platen.

The slide base 32, which alternatively may be termed a slide base fixture, includes a generally rectangular metallic block 54 having a substantially planar lower reference surface **54*a*, termed the third reference surface of the support assembly 10, adapted for sliding engagement with the reference surface 48*a* on the platen 48 so as to facilitate sliding movement therealong. To facilitate predetermined guided movement of the slide base 32 longitudinally of the platen 48, the block member 54 has transverse ends 54*b* and 54*c* in which are formed open-ended slots 56*a–f* such that each pair of aligned oppositely directed slots overlies one of the parallel guide channels 50*a–c* formed in the platen 48. Suitable headed guides or tie-down screws, such as indicated at 60 in FIG. 6, have their head ends sized to be received within the guide channels 50*a–c* in sliding relation therein and have upper threaded ends extending upwardly within the slots 56*a–f* in the slide base to receive suitable hold-down nuts 62 thereon. In this manner, the slide base 32 may be selectively positioned along the longitudinal length of the platen 48 while being maintained in predetermined alignment on the platen by the guide screws 60 which comprise guide means mutually cooperable with the base member 30** and slide base so as to facilitate predetermined sliding movement of the slide base relative to the base member.

The slide base block 54 has a second planar reference surface **54*d* formed thereon which is parallel to the reference surface 54*a* and defines a fourth reference surface of the support assembly 10. Reference surface 54*d* is bounded on its transverse marginal edges by inverted L-shaped guide members 64*a* and 64*b* which are suitably affixed to the slide base block so as to cooperate with surface 54*a* to define opposed guide channels. The guide channels defined by the guide members 64*a*, *b* cooperate with the reference surface 54*d* to establish a rectilinear guide path on the reference surface 54*d* transverse to the major longitudinal axis of the slide base block 54, and thereby transverse to the guide channels 50*a–c* formed in the platen 48. A screw block 66 is affixed in upstanding relation to the slide base block 54 and has a threaded bore 66*a* (FIG. 6) therethrough adapted for threaded cooperation with the threaded shank 68*a* of an adjusting screw member 68 which provides first adjustment means for selectively adjusting the position of the horizontal slide block 34 relative to the slide base 32**, as will become more apparent hereinbelow.

Figure 5:
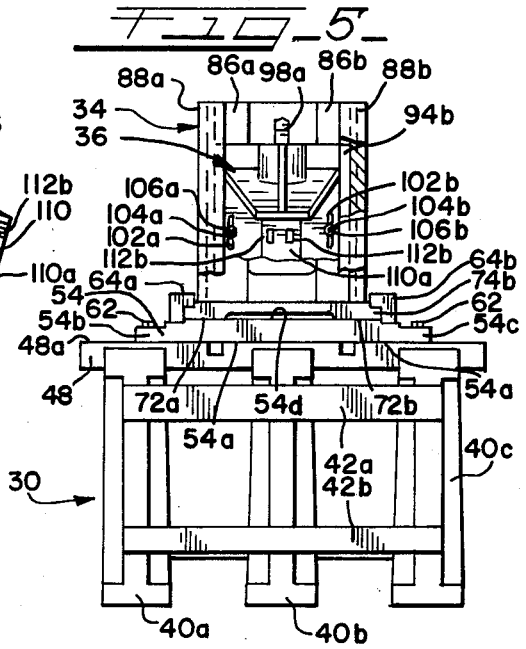
FIG. 5 is a front elevational view of the work rest support assembly shown in FIG. 4, portions being broken away for purposes of illustration.

The reference surface 54*d* on the slide base 32 serves as a horizontal reference surface to slidingly receive coplanar reference surfaces 72*a* and 72*b* formed on the horizontal slide block 34, as illustrated in FIG. 5. The reference surfaces 72*a,b* collectively define a fifth reference surface of the support assembly 10 and are contiguous, respectively, to laterally outwardly extending flanges 74*a* and 74*b* which are formed on the horizontal slide block 34 and are received within the opposed guide channels defined by the guide members 64*a,b*. In this manner, sliding movement of the horizontal slide block relative to the slide base 32 may be effected along the rectilinear guide path defined by guide members 64*a,b*. To effect selective movement of the horizontal slide block 34 along reference surface 54*d* in a direction transverse to the longitudinal axis of the platen 48, the horizontal slide block is suitably connected to an inner end of the adjusting screw 68 such that rotation of the adjusting screw operates to move the horizontal slide block 34 relative to the slide base 32. To facilitate locking of the horizontal slide block 34 to the slide base 32 after selective adjustment therebetween, the horizontal slide block is provided with a plurality of parallel elongated through-slots 76*a*, 76*b*, and 76*c* (FIG. 3) which receive upstanding studs or threaded posts 78 on which are threadedly secured nuts 78. After selective adjustment of the horizontal slide block, the nuts 78 may be tightened against the horizontal slide block to releasably retain it in adjusted position.

The horizontal slide block 34 has a second reference surface defined by coplanar surfaces 86*a* and 86*b* (FIG. 3) which lie in a plane perpendicular to the plane of the reference surfaces 72*a* and 72*b*. The reference surfaces 86*a* and 86*b*, which collectively define a sixth reference surface of the support assembly 10, cooperate with vertical guide members 88*a* and 88*b*, respectively, which are fixed to the horizontal slide block so as to define a guide channel which slidingly receives the vertical slide block 36. To this end, the vertical slide block 36 defines a planar reference surface 92, termed the seventh reference surface of the support assembly 10, adapted to engage the coplanar reference surfaces 86*a,b* in sliding relation therewith such that laterally opposite edges 94*a* and 94*b* of the vertical slide block are received within the aforementioned guide channel defined between the guide members 86*a,b*. In this manner, sliding movement of the vertical slide block relative to the horizontal slide block may be effected along a rectilinear guide path defined by the guide members 86*a,b*.

In the illustrated embodiment, second adjustment means in the form of an adjusting screw 98 is operatively associated with the horizontal and vertical slide blocks in a manner to enable selective movement of the vertical slide block relative to the horizontal slide block. To this end, the screw 98 has a threaded shank 98*a* received through a threaded bore in a support block 100 fixed on the horizontal slide block 34 such that the adjusting screw lies parallel to the guide surfaces 86*a,b*. The lower end of the adjusting screw 98 is suitably connected to the vertical slide block 36 such that selective rotation of the adjusting screw effects movement of the vertical slide block along the guide surfaces 86*a,b*. Preferably, the vertical slide block 36 has a pair of parallel elongated through-slots, indicated at 102*a* and 102*b* in FIG. 5, adapted to receive threaded stub shafts 104*a* and 104*b*, respectively, therethrough, the stub shafts being fixed in normal relation to the reference surfaces 86*a* and 86*b* and having nuts 106 received thereon which may be tightened after positioning the vertical slide block relative so as to releasably lock it to the horizontal slide block.

Figure 6:
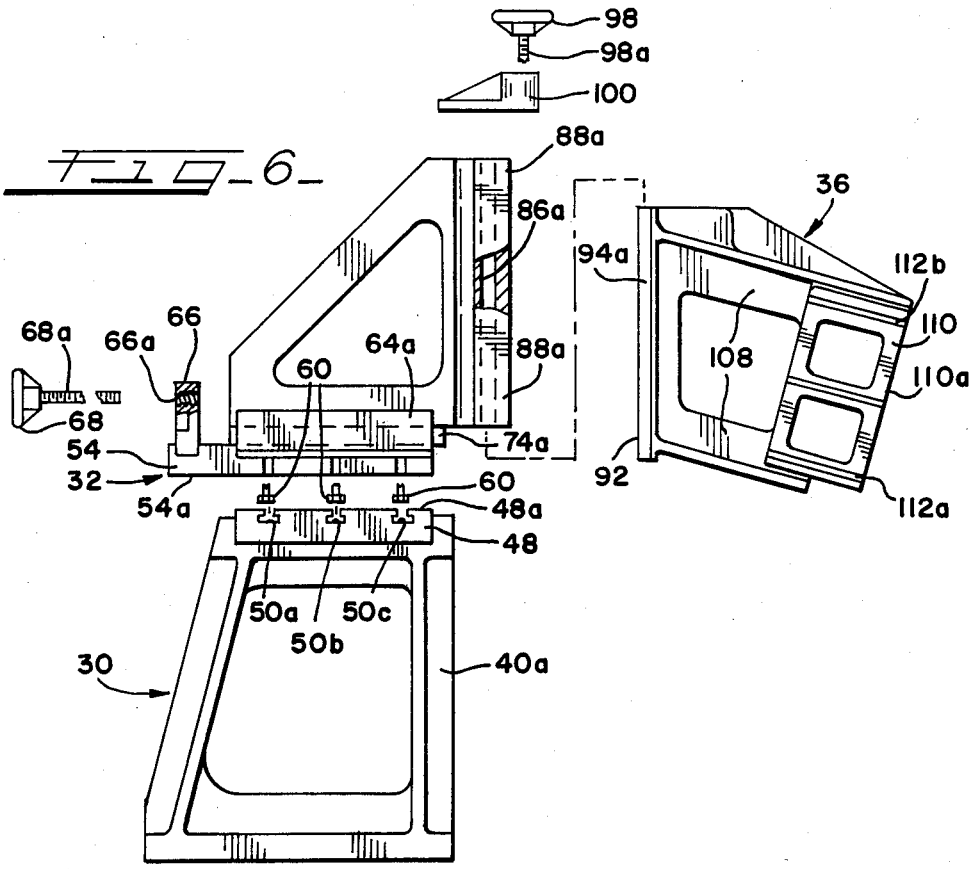
FIG. 6 is a side elevational view of the work rest support assembly shown in FIG. 4 but on an enlarged scale and with various components spaced from each other for purposes of illustration.

Referring to FIG. 6, the vertical slide block 36 has a downwardly canted web portion 108 having an enlarged work rest support block portion 110 formed integral thereon such that an outer exposed planar surface 110*a* forms an included angle of approximately 15° with the plane of the reference surface 92. The support block portion 110 of the vertical slide block has opposite outwardly facing parallel surfaces 110*b* and 110*c* each of which has a pair of parallel T-shaped guide channels or grooves formed therein, such as indicated at 112*a* and 112*b* in FIG. 6. The guide channel slots 112*a,b* intersect the end surface 110*a* in perpendicular relation thereto, and open outwardly of the opposite side surfaces of the support block and are adapted to receive headed mounting screws 114 to facilitate mounting of the aforementioned pass-through work rests 28 in tandem relation on the vertical slide block 36 as illustrated in FIGS. 1 and 2.

The pass-through work rests 28 may be of conventional design and, in the illustrated embodiment, include support arms 28*a*, 28*b* and 28*c* having rollers supported on their outermost ends for line contact with the peripheral surface of a workpiece. The arms 28*a*, 28*b* and 28*c* on each of the pass-through work rests are actuable through an associated pressure cylinder 118 so as to effect opening and closing of the arms 28*a* and 28*b* to accommodate different diameter workpieces. Pass-through work rests of other designs may also be employed with the work rest support assembly 10.

In operation, the work rest support assembly 10 is positioned on a suitable support surface, such as a floor surface or the platform 44, so that the work rests 28 are positioned relatively close to and generally centrally along the length of the elongated heavy workpiece 22 supported by the associated machine tool, such as the lathe 12. The pedestals 40*a,b* and *c* of the base member 30 are preferably releasably affixed to the support surface or platform, as through the mounting screws 46, such that surface 48*a* is substantially horizontal and the guide channels 50*a–c* in the platen 48 are generally parallel to the longitudinal centerline of the workpiece 22. With the slide base 32, horizontal slide block 34 and vertical slide block 36 being assembled to each other and to the platen 48 as aforedescribed, the slide base 32 may be selectively adjusted along the length of the platen reference surface 48 and tightened thereagainst through the guide screws 60 as aforedescribed. Thereafter, the horizontal slide block 34 and vertical slide block 36 may be adjusted to a desired location relative to the workpiece through the adjusting screws 68 and 98 to facilitate selective exacting adjustment of the pass-through work rests 28 in two mutually perpendicular planes relative to the workpiece centerline. When taken with the prior adjustment of the slide base 32 relative to the base member 30, it will be appreciated that adjustment of the pass-through work rests in three mutually perpendicular planes has been facilitated by the support assembly 10 such that the pass-through work rests may be brought to exact positions relative to the longitudinal axis of the workpiece, whereafter the arms 28*a–c* are actuated into supporting relation with the workpiece to prevent sagging thereof during turning or other machining of the workpiece.

While a preferred embodiment of the present invention has been illustrated and described, it will be understood that changes and modifications may be made therein without departing from the invention in its broader aspects. Various features of the invention are defined in the following claims.

What is claimed is:

1. A stand-alone work rest support assembly for enabling positioning of a work rest relative to a workpiece support axis of a machine tool or the like, said support assembly comprising, in combination:

a base member defining a first reference surface adapted to engage a floor support surface or the like, and defining a second reference surface substantially parallel to said first base reference surface;

a slide base defining a third reference surface adapted for sliding relation with said second reference surface, said slide base defining a fourth reference surface and including means establishing a first rectilinear guide path on said fourth reference surface;

guide means mutually cooperable with said base member and said slide base so as to facilitate predetermined sliding movement of said slide base relative to said base member;

a horizontal slide block supported by said slide base and defining a fifth reference surface adapted for sliding relation with said fourth reference surface along said first guide path, said horizontal slide block defining a sixth reference surface lying in a plane substantially perpendicular to said fifth reference surface and including means establishing a second rectilinear guide path on said sixth reference surface;

first adjustment means operatively associated with said slide base and said horizontal slide block in a manner to enable selective movement of said horizontal slide block along said first guide path relative to said slide base;

a vertical slide block defining a seventh reference surface adapted for sliding relation with said sixth reference surface in guided relation along said second guide path; and second adjustment means operatively associated with said horizontal and vertical slide blocks and selectively operable to effect movement of said vertical slide block relative to said horizontal slide block along said second guide path, said vertical slide block being adapted to support at least one pass-through work rest such that selective positioning of said base member, slide base, and horizontal and vertical slide blocks relative to each other is operative to selectively position said work rest in three mutually perpendicular planes.

2. A work rest support assembly as defined in claim 1 wherein said base member includes a plurality of guide channels formed in said second reference surface, said guide means including a plurality of guide elements adapted to be received in guided relation within said guide channels and adapted for operatively connection to said slide base.

3. A work rest support assembly as defined in claim 2 wherein said guide channels have substantially inverted T-shaped transverse cross-sectional configurations, said guide elements having headed portions slideable within said guide channels and adapted for connection to said slide base in a manner to facilitate guided movement of said slide base relative to said base member.

4. A work rest support assembly as defined in claim 4 wherein said guide elements are adapted to enable releasable locking of said slide base to said base member.

5. A work rest support assembly as defined in claim 1 wherein said first and second adjustment means comprise first and second adjustment screws, said first adjusting screw having operative association with said slide base and said horizontal slide block, said second adjusting screw having operative association with said horizontal slide block and said vertical slide block, said adjustment screws being selectively rotatable, respectively, to effect movement of said horizontal slide block relative to said slide base member, and movement of said vertical slide block relative to said horizontal slide block.

6. A work rest support assembly as defined in claim 1 wherein said vertical slide block defines a mounting block adapted to have a pair of work rests mounted thereon in tandem relation.

7. A work rest support assembly as defined in claim 6 wherein said mounting block defines a plurality of parallel generally T-shaped channels facilitating mounting of said work rests thereon through mounting members having headed ends adapted to be received within said mounting channels.

8. A work rest support assembly as defined in claim 1 including means cooperative with said slide block and said horizontal slide block in a manner to enable releasable locking of said horizontal slide block in fixed relation to said slide base.

9. A work rest support assembly as defined in claim 8 including means cooperative with horizontal slide block and said vertical slide block in a manner to enable releasable locking of said vertical slide block in fixed relation to said horizontal slide block.

10. A stand-alone work rest support assembly for enabling positioning of a work rest relative to a workpiece support axis of a machine tool or the like, said support assembly comprising, in combination:

a base member defining a first reference surface adapted to engage a floor support surface, and defining a second horizontal reference surface;

a slide base defining a third reference surface adapted for sliding relation with said second reference surface, said slide base defining a fourth reference surface parallel to said fourth reference surface and establishing a first guide path thereon;

guide means mutually cooperable with said base member and said slide base so as to facilitate predetermined sliding movement of said slide base along said second reference surface relative to said base member;

a horizontal slide block supported by said slide base and defining a fifth reference surface adapted for sliding relation with said fourth reference surface along said first guide path, said horizontal slide block defining a sixth reference surface lying in a plane substantially perpendicular to said fifth reference surface and establishing a second guide path thereon;

first adjustment means operatively associated with said slide base and said horizontal slide block in a manner to enable selective movement of said horizontal slide block along said first guide path relative to said slide base;

a vertical slide block defining a seventh reference surface adapted for sliding relation with said sixth reference surface in guided relation along said second guide path; and second adjustment means operatively associated with said horizontal and vertical slide blocks and selectively operable to effect movement of said vertical slide block relative to said horizontal slide block along said second guide path, said vertical slide block being adapted to support at least one pass-through work rest such that selective positioning of said base member, slide base, and horizontal and vertical slide blocks relative to each other is operative to selectively position said work rest in three mutually perpendicular planes.

11. A stand-alone support assembly for supporting at least one pass-through work rest in independent relation to a machine tool, said support assembly comprising, in combination, a base member, a slide base, a horizontal slide block, a vertical slide block, and a pass-through work rest supported by said vertical slide block, said base member, slide base horizontal and vertical slide blocks being mutually cooperable to facilitate positioning of the pass-through work rest in three mutually perpendicular planes so as to enable exact positioning of the work rest relative to a workpiece support axis defined by the machine tool.

* * * * *